(12) United States Patent
Han et al.

(10) Patent No.: US 7,734,434 B2
(45) Date of Patent: Jun. 8, 2010

(54) HIGH SPEED DIGITAL WAVEFORM IDENTIFICATION USING HIGHER ORDER STATISTICAL SIGNAL PROCESSING

(75) Inventors: Kyungtae Han, Hillsboro, OR (US); Keith R. Tinsley, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/694,809

(22) Filed: Mar. 30, 2007

(65) Prior Publication Data
US 2008/0240326 A1    Oct. 2, 2008

(51) Int. Cl.
G01R 29/26 (2006.01)
H04L 7/00 (2006.01)
(52) U.S. Cl. ........................... 702/69; 375/372
(58) Field of Classification Search ............... 702/69, 702/179, 183, 189; 375/371, 372, 376, 228
See application file for complete search history.

(56) References Cited

U.S. PATENT DOCUMENTS

| | | |
|---|---|---|
| 6,598,004 B1 | 7/2003 | Ishida et al. |
| 6,795,496 B1 | 9/2004 | Soma et al. |
| 6,973,195 B1 * | 12/2005 | Matsui .................. 382/100 |
| 6,993,460 B2 * | 1/2006 | Beadle et al. ............ 702/196 |
| 2006/0067390 A1 | 3/2006 | Tek et al. |
| 2006/0267812 A1 | 11/2006 | Bunin |
| 2007/0110146 A1 * | 5/2007 | Tabatabaei .............. 375/228 |

FOREIGN PATENT DOCUMENTS

WO    2008/121841 A1    10/2008

OTHER PUBLICATIONS

International Search Report/Written Opinion for PCT Patent Application No. PCT/US2008/058699, Mailed on Aug. 8, 2008, 10 pages.
International Preliminary Report on Patentability received for PCT Application No. PCT/US2008/058699, mailed on Oct. 15, 2009, 2 pages.

* cited by examiner

*Primary Examiner*—Bryan Bui
(74) *Attorney, Agent, or Firm*—Robert D. Anderson

(57) ABSTRACT

In some embodiments an apparatus includes a higher order statistical signal processor to process a jittered digital signal, a diagonal line average unit to identify a distinct line in a signal output from the higher order statistical signal processor, and a peak detection unit to determine a peak value in response to an output of the diagonal line average unit and to provide a data rate signal as an output. Other embodiments are described and claimed.

16 Claims, 5 Drawing Sheets

HIGH SPEED DIGITAL WAVEFORM IDENTIFICATION USING HIGHER ORDER STATISTICAL SIGNAL PROCESSING

TECHNICAL FIELD

The inventions generally relate to high speed digital waveform identification using higher order statistical signal processing.

BACKGROUND

High data-rate digital waves are widely used in digital data communications to send and receive data. A PCI (Peripheral Component Interconnect) Express bus system using high data-rate digital waves becomes a broadband interference source that decreases other communications such as wireless communication subsystems, for example. Radio communication performance in a computing platform can be degraded by high frequency noise sources such as, for example, PCI Express bus, clocks, and other wireless communication systems. A way of mitigating such interferences and degradations would be beneficial.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
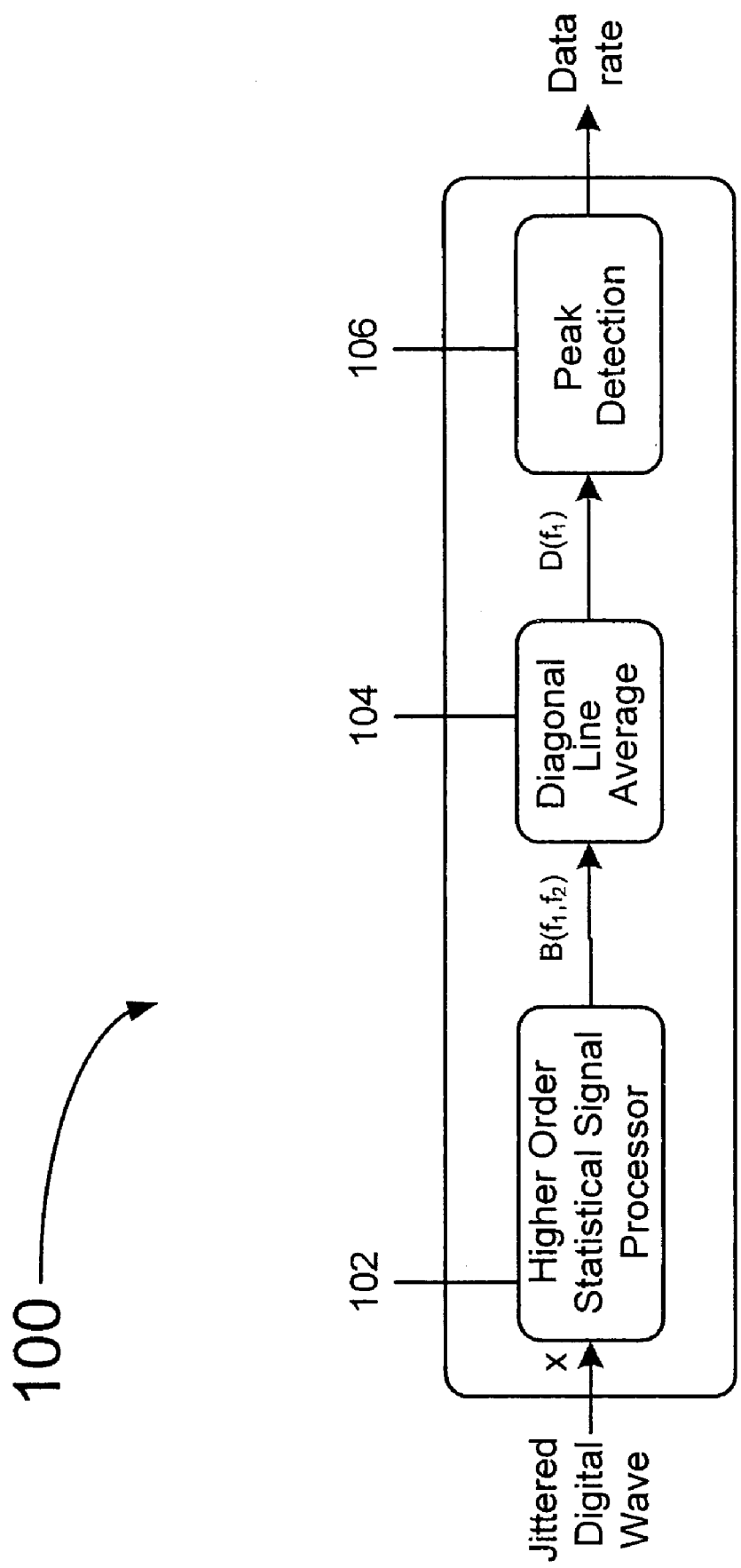
FIG. 1 illustrates an apparatus according to some embodiments of the inventions.

Some embodiments of the inventions relate to high speed digital waveform identification using higher order statistical signal processing.

The inventions generally relate to high speed digital waveform identification using higher order statistical signal processing herein termed as, but not limited to, a bicoherence function.

Some embodiments of the inventions relate to high speed digital waveform identification using bicoherence.

In some embodiments an apparatus includes a higher order statistical signal processor to process a jittered digital signal, a diagonal line average unit to identify a distinct line in a signal output from the higher order statistical signal processor, and a peak detection unit to determine a peak value in response to an output of the diagonal line average unit and to provide a data rate signal as an output.

In some embodiments higher order statistical signal processing of a jittered digital signal is performed, a distinct line in a signal output from the higher order statistical signal processing is identified using diagonal line averaging, and a peak value is determined in response to the identified distinct line.

Radio communication performance in a computing platform can be degraded by high frequency noise sources such as PCI Express bus, clocks, and other wireless communication systems (for example, WiMax implementations, PCI Express implementations, digital signal processor or DSP implementations, and/or many-core implementations). In some embodiments it is possible to identify the noise source and to improve radio communication performance in a computing platform. This can be accomplished by performing actions such as changing the wireless channel, I/O channel, power level, and/or clock frequency in response to the identified source, for example. In some embodiments, radio frequency interference (RFI), platform noise, and/or broadband interference may be mitigated. In some embodiments a source may be identified by unique characteristics (for example, such as timing jitter) to allow for mitigation of the interferences.

The convergence of computing and communication brings together two traditionally independent subsystems in today's wireless platforms: high-speed interconnects (I/O) and wireless communications. High-speed digital interconnects and their associated base clocks are becoming sources of radio frequency interference (RFI) due to harmonics overlapping into frequency bands intended solely for wireless communications. These RFI sources have unique characteristics such as power spectral densities, phase profiles over time/frequency, and statistical properties (for example, mean, variance, skewness and/or kurtosis) that can be leveraged for either RFI source detection, leading to eventual RFI mitigation. In some embodiments higher order statistical signal processing (HOSSP) (for example, bicoherence) may be used in order to uniquely identify RFI signal characteristics, and their potential for impact upon a radio channel of interest is determined.

High speed I/O signals have non-idealities due to variations in symbol rise and fall times, termed "timing jitter". Timing jitter in a high speed I/O signal cannot be identified using the power spectrum. However, in some embodiments, timing jitter is detected using high order statistics. For example, timing jitter may be detected using the bispectrum of sampled data, as shown for example, in "The bispectrum of sampled data: Part i-detection of the sampling jitter," I. Sharfer and H. Messer, IEEE Trans. Signal Processing, Vol. 41, No. 1, pages 296-312, 1993. The presence of jitter introduces nonzero contribution to the discrete bispectrum in the outer triangle of the principal domain. Based on this observation, a binary hypothesis test may be used as a detection method. Other information such as the corresponding symbol rate ($R_S$) or frequency ($f_i$) of the input signals cannot be obtained from computation of the bispectrum. It is the unique detection of this symbol rate by an HOSSP estimator that will lead to meaningful RFI signal identification by classifying the RFI source as either harmful or benign to the wireless subsystem in question.

A waveform's signal rate can be estimated by many approaches such as an instantaneous phase detector, a delay and multiply detector, a spectral correlation detector, or a higher-order spectra detector, for example. While these approaches detect the symbol rate of unknown digital communication signals, the detection of RFI in the presence of alternate non-jittered interference or low signal to noise (SNR) data signals cannot be obtained using these approaches. Therefore, in some embodiments, an identification implementation is used to estimate the symbol rate of the jittered signal using polyspectral analysis in the presence of alternate Gaussian or non-Gaussian contributions.

Bicoherence is used in some embodiments to detect system nonlinearities and to study phase relations of their harmonic components. By observing the phase coupling introduced by nonlinearities, bicoherence spectra can detect machine faults, for example. In general, HOSSP techniques have wide applicability (for example, in the extraction of unique pulmonary pathology features associated with musical lung sounds) and offer increased analysis capabilities necessary for determining potential platform and/or system impacts.

In some embodiments, bicoherence is used to identify RFI source characteristics. A distinct line pattern is observed using estimated bicoherence. The inventors have identified that the line pattern is related to the period of input sources. In some embodiments, an identifier utilizes the line pattern in the estimated bicoherence by using diagonal line average and peak detection units to identify the source. In some embodiments, the identifier can identify PCI Express signals, for example.

FIG. 1 illustrates an apparatus 100 according to some embodiments. In some embodiments apparatus 100 is referred to as an identifier. In some embodiments apparatus 100 includes a higher order statistical signal processing (HOSSP) unit 102, a diagonal line average unit 104, and a peak detection unit 106. In some embodiments, apparatus 100 is an identifier for a high speed jittered digital interconnect (for example, I/O or input/output interconnect device). In some embodiments, apparatus 100 is an identifier for a high speed jittered digital interconnect (and/or I/O).

In some embodiments HOSSP unit 102 is a bicoherence unit. In some embodiments, HOSSP unit 102 produces an estimated bicoherence $B(f_1,f_2)$ at frequency $f_1$ and $f_2$ of input signal x. In some embodiments, bicoherence of a discrete-time signal is a period function in two frequency indexes. In some embodiment, the bispectrum and bicoherence of a discrete-time signal are periodic functions described in two frequency indexes $(f_1,f_2)$. In some embodiments the bispectrum $S(f_1,f_2)$ of a process $\{x(k)\}$ is defined, for example, in "Signal processing with higher-order spectra", C. L. Nikias and J. M. Mendel, IEEE Signal Processing Magazine, No. 10, pages 10-37, 1993, as:

$$S(f1,f2)=E\{X(f1)X(f2)X^*(f1+f2)\},$$

where $E\{.\}$ is the expectation operator, $X(f_i)$ is the complex Fourier coefficient of the process x(k) at frequency $f_i$, and the $X^*(f_i)$ is it complex conjugate.

In some embodiments the normalized bispectrum is defined as:

$$B(f1,f2) = \frac{S(f1,f2)}{[P(f1)P(f2)P(f1+f2)]1/2}$$

where $P(f_i)$ is the power spectrum at frequency $f_i$. The magnitude of the normalized bispectrum, $|B(f1,f2)|$, is called bicoherence. The bicoherence quantifies the presence of quadratic phase coupling (QPC) between any two frequency components due to their non-linear interactions. Two frequency components are said to be quadratically phase coupled with bicoherence close to or greater than 1 when a third frequency component exists whose frequency and phase are the sum of the frequencies and phases of the first two components.

Corresponding bicoherence of a Gaussian process, pseudo random bit streams (PRBS), and the RFI signal of interest have been compared and analyzed by the inventors. Under Gaussian assumption, bicoherence was found to be zero.

Figures 2A, 2B:
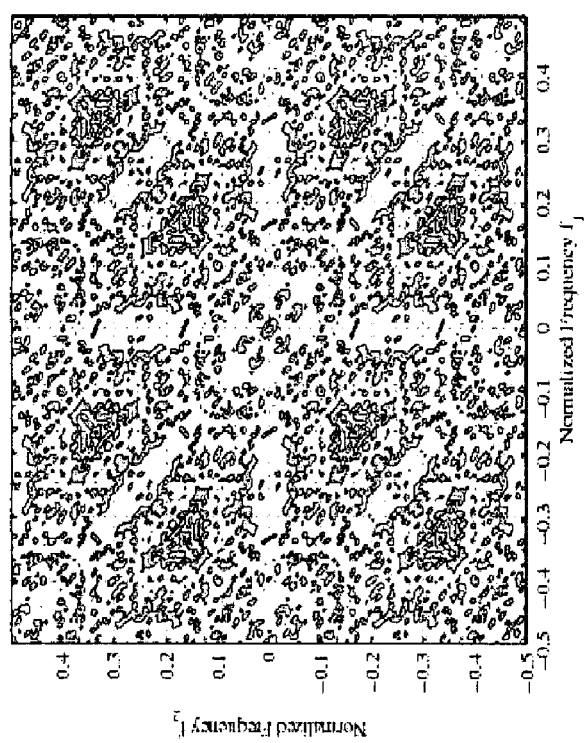
FIG. 2A illustrates a view of an ideal pseudo random digital bit stream (PRBS) according to some embodiments of the inventions.
FIG. 2B illustrates a view of a jittered pseudo random digital bit stream (PRBS) according to some embodiments of the inventions.

FIG. 2A illustrates a view 200A of an ideal pseudo random digital bit stream (PRBS) and FIG. 2B illustrates a view 200B of a jittered pseudo random digital bit stream (PRBS). The ideal and jittered pseudo random digital bit streams of FIG. 2A and FIG. 2B are simulated to estimate bicoherence. In FIG. 2B, the estimated bicoherence of jittered PRBS shows a distinct line pattern. The inventors have discovered that the line pattern of FIG. 2B includes information such as the data rate and the variance of input digital waves, for example. The ideal PRBS signal in FIG. 2A, was provided with, for example, symmetrical shape or identical rise and fall times. The non-ideal PRBS signal, for example, with asymmetric shape or different rise and fall time, exhibits distinct line patters, for example, as illustrated in FIG. 2B. By changing the data rate of PRBS, it has been observed by the inventors that the diagonal line shifts according to the data rate, and that the cross point between the extended diagonal line and the x or y axis indicates the data rate of PRBS. Therefore, it has been determined that the data rate of a non-ideal digital wave can be estimated using bicoherence.

In some embodiments the diagonal line average unit 104 of FIG. 1 recognizes the distinct line in bicoherence for data rate estimation by using line averages as diagonals as:

$$D(f)=E[B(f_1,f_2)], \text{when } f=f_1+f_2, f_1>0, f_2>0, \text{ and } f_1>f_2$$
(principle area)

where E is the expectation

Figure 3B:
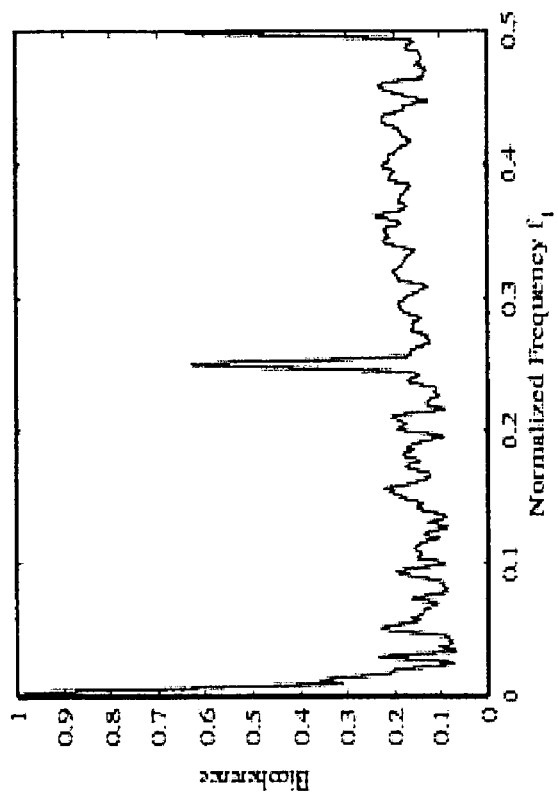
FIG. 3B illustrates a graph of a diagonal line average of jittered PRBS according to some embodiments of the inventions.
Figure 3A:
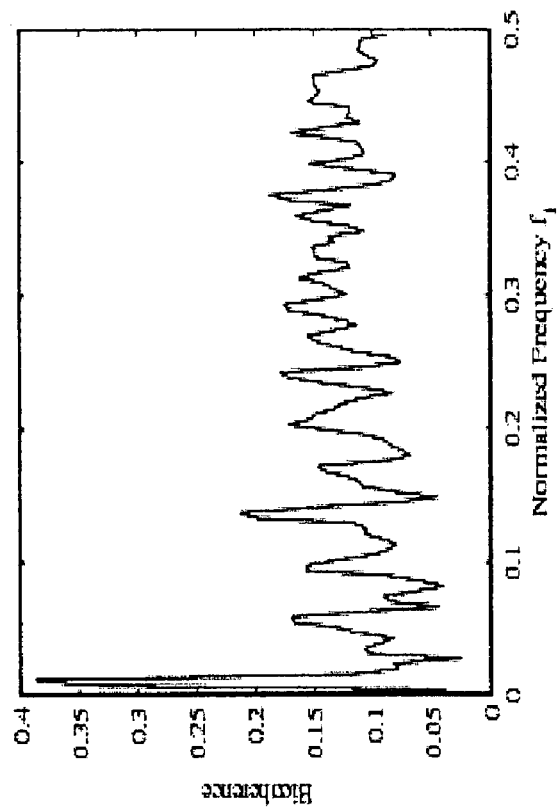
FIG. 3A illustrates a graph of a diagonal line average of ideal PRBS according to some embodiments of the inventions.

FIG. 3A illustrates a graph 300A of a diagonal line average of ideal PRBS, and FIG. 3B illustrates a graph 300B of a diagonal line average of jittered PRBS. Ignoring the value close to zero frequency, the diagonal line value in jittered PRBS shows a peak at a normalized frequency of 0.25, which is the same as the data rate of the input PRBS signal.

In some embodiments the peak detection unit 106 of FIG. 1 searches for a peak value of an input above a threshold. In some embodiments, peak detection unit 106 searches for a peak value with setting a threshold, except near zero value to ignore zero frequency. The frequency near zero is ignored in some embodiments. For instance, by setting a threshold of 0.5 as illustrate in FIG. 3A and FIG. 3B, the peak detection unit 106 produces nothing (in π rad/sec) for ideal PRBS (FIG. 3A), and 0.25 (in n rad/sec) for jittered PRBS (FIG. 3B). The peak detection unit 106 produces the data rate of jittered digital waves. Therefore, in some embodiments, jittered digital wave is detected, and also the corresponding data rate is estimated for identification.

Figure 4:
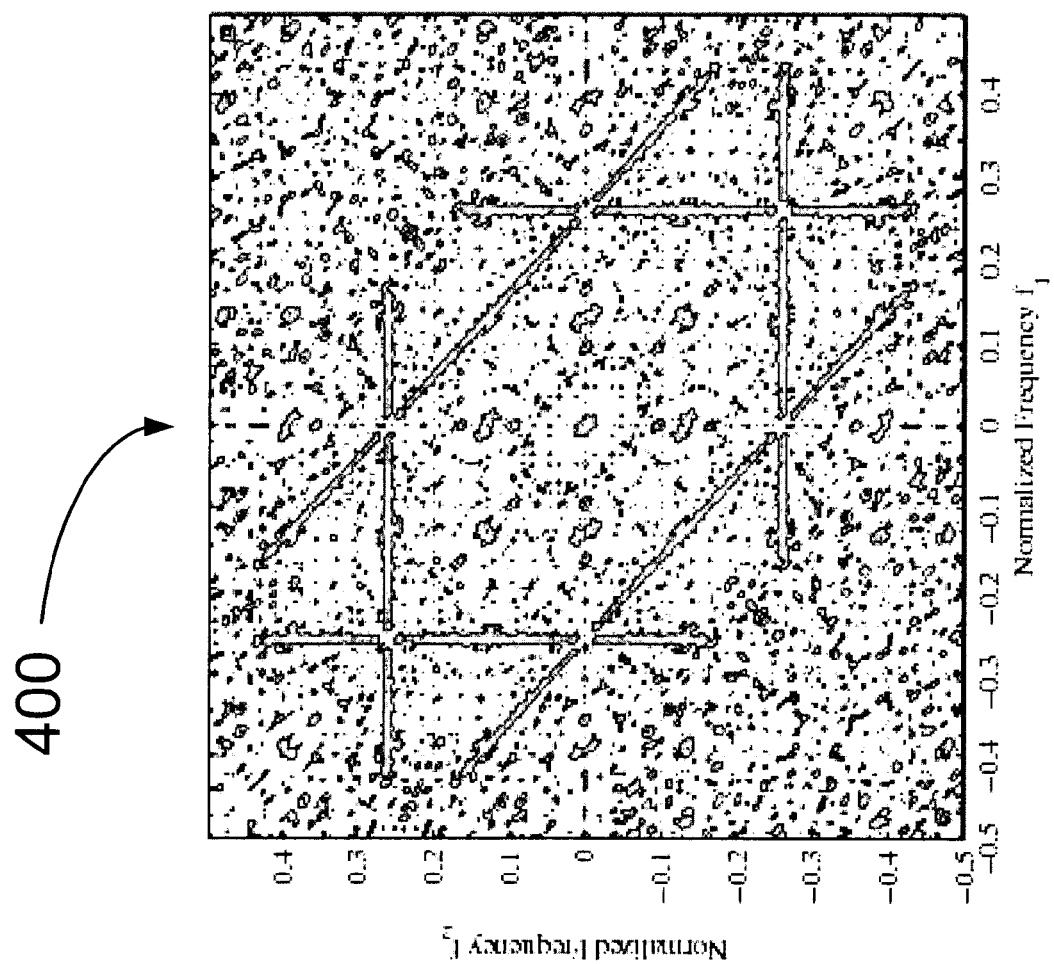
FIG. 4 illustrates a view of an estimated bicoherence of a measured PCI (Peripheral Component Interconnect) Express signal according to some embodiments of the inventions.

FIG. 4 illustrates a view 400 of an estimated bicoherence of a measured PCI (Peripheral Component Interconnect) Express signal. The PCI Express bus is widely used in computers to communicate with a high speed data rate. Practically, the various sources of deterministic or random jitter such as signal reflection, cross talk on transmission lines, and non-linear properties of electronic components give rise to non-ideal PCI Express signals. The data rate of a PCI Express signal may be estimated using bicoherence. For example, in some embodiments, a practical PCI Express signal of 5.25 GHz is sampled by a 20 GHz/sample sampler. The estimated bicoherence $B(f_1,f_2)$ of such a signal is illustrated in FIG. 4. The estimated bicoherence illustrated in FIG. 4 illustrates a distinct diagonal line in a manner similar to the distinct diagonal line illustrated in FIG. 2B, since the practical PCI Express signal has a jittered digital waveform shape. This implies that the measured PCI Express signal is a non-ideal signal.

Figure 5:
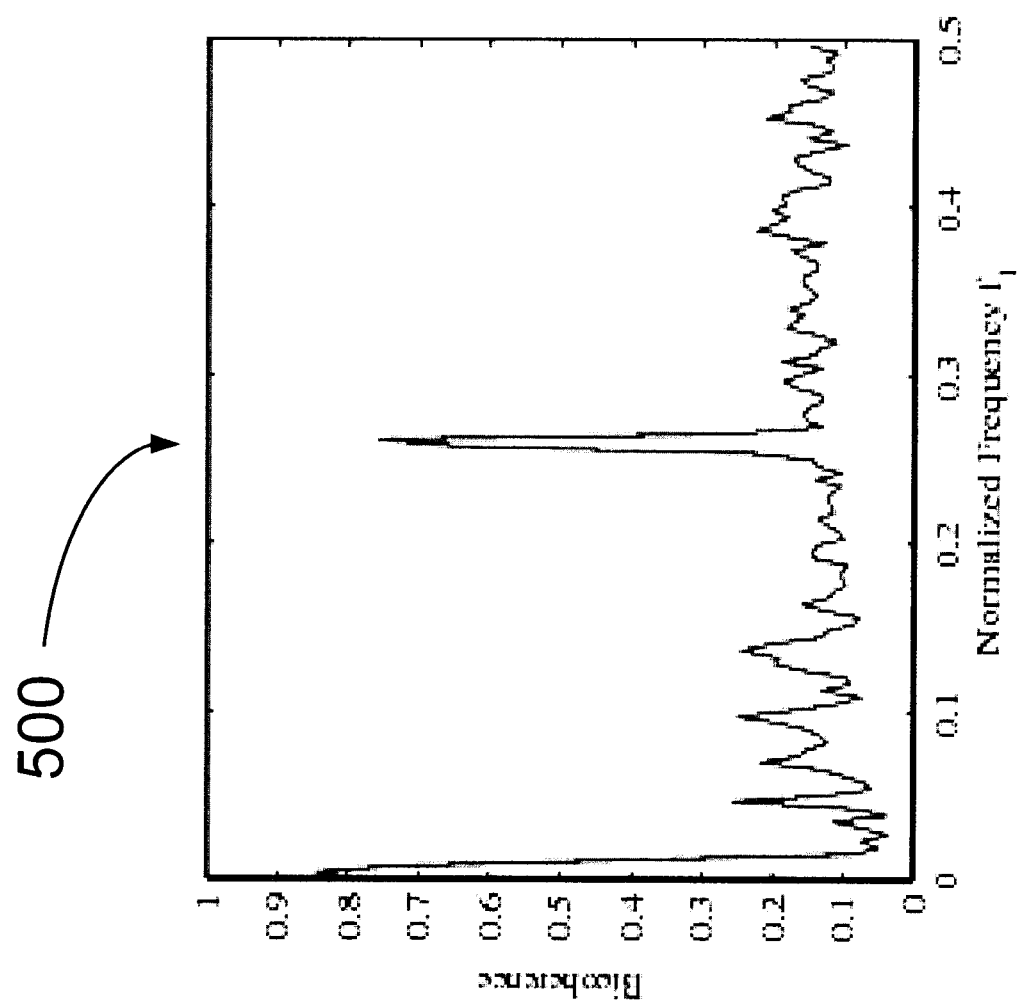
FIG. 5 illustrates a graph of a diagonal line average of estimated bicoherence in a measured PCI Express signal according to some embodiments of the inventions.

FIG. 5 illustrates a graph 500 of a diagonal line average of estimated bicoherence in a measured PCI Express signal. Diagonal line average of the estimated bicoherence of the measured PCI Express signal shows two peaks as illustrated in FIG. 5. Ignoring the values near zero frequency, the peak detection unit produces a peak frequency of 0.2617. The output of the peak detection unit 106 (or also referred to as a threshold unit) with a threshold of 0.5 is 0.2617 (in n rad/sec). Thus, the estimated data rate of the PCI Express signal is 5.234 GHz/sample (=20 GHz/sample×0.2617), which is close to the real data rate of 5.25 GHz/sample of PCI Express. The small difference between the estimated and real data rate comes from, for example, the limited size of FFT in the bicoherence computation, for example.

In order to gauge the compatibility of PCI Express signal detection, sine wave and/or Gaussian noise data can be added to the PCI Express signal data. In some embodiments, in a detected frequency value with respect to signal-to-noise ratio (SNR) comparison, at high SNR the identifier with both noises is estimated at the correct frequency value of 0.2617. In some embodiments, the identifier with the Gaussian noise cannot estimate a correct frequency value at a low SNR. The peak value of a corresponding frequency according to SNR can also be compared. In some embodiment, thresholds in the peak detection unit could affect performance. The PCI Express signal with sine wave noise above −40 dB and Gaussian noise above 25 dB can be detected, for example, by setting the threshold to a value of 0.5, thus illustrating that the identifier is robust to sine wave noise.

In some embodiments higher order statistical signal processing or HOSSP (for example, using bicoherence) in non-ideal waves shows a distinct line pattern, which is related to the input data rate (for example, of a jittered digital signal). The line pattern information is utilized to estimate a data rate for identifying the source. PCI Express bus signals may be non-ideal, and a data rate of PCI Express may be determined using some embodiments. In some embodiments, jittered digital waves may be detected and/or an estimated data rate of jittered digital waves may be determined.

In some embodiments computational processing power (for example, using a microprocessor such as an Intel processor) is used to effectively detect and discriminate radio frequency interference (RFI) signals. Upon identification, unique RFI mitigation may be applied to optimize platform and wireless performance, for example.

Although some embodiments have been described herein as being implemented in a particular manner such as, for example, using higher order statistical signal processing techniques implementing bicoherence, according to some embodiments these particular implementations may not be required.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An apparatus comprising:
   a higher order statistical signal processor to process a jittered digital signal;
   a diagonal line average unit to use an expectation of principle area to identify a distinct line in a signal output from the higher order statistical signal processor; and
   a peak detection unit to determine a peak value in response to an output of the diagonal line average unit and to provide a data rate signal as an output;
   wherein interference mitigation is performed in response to the output of the peak detection unit.

2. The apparatus of claim 1, wherein the higher order statistical signal processor is a bicoherence unit.

3. The apparatus of claim 2, wherein the bicoherence unit produces an estimated bicoherence at two frequency indexes of the jittered digital signal.

4. The apparatus of claim 1, wherein the jittered digital signal is a jittered high speed digital wave.

5. The apparatus of claim 1, wherein the jittered digital signal is a PCI Express signal.

6. The apparatus of claim 1, wherein the jittered digital signal is a non-ideal jittered pseudo random digital bit stream.

7. The apparatus of claim 1, wherein the output of the digital line average unit provides information including the data rate and the variance of the jittered digital signal.

8. The apparatus of claim 1, wherein the Output of the peak detection unit provides information including the data rate of the jittered digital signal.

9. A method comprising:
   performing higher order statistical signal processing of a jittered digital signal using a higher order statistical signal processor;
   identifying a distinct line in a signal output from the higher order statistical signal processing using an expectation of principle area in a diagonal line averaging unit;
   determining a peak value and a data rate signal output in response to the identified distinct line using a peak detection unit, wherein interference mitigation is performed in response to the peak value and the outputted data rate.

10. The method of claim 9, wherein the higher order statistical signal processing used bicoherence.

11. The method of claim 10, wherein an estimated bicoherence is produced at two frequency indexes of the jittered digital signal.

12. The method of claim 9, wherein the jittered digital signal is a jittered high speed digital wave.

13. The method of claim 9, wherein the jittered digital signal is a PCI Express signal.

14. The method of claim 9, wherein the jittered digital signal is a non-ideal jittered pseudo random digital bit stream.

15. The method of claim 9, wherein the distinct line provides information including the data rate and the variance of the jittered digital signal.

16. The method of claim 9, wherein the output of the peak value provides information including the data rate of the jittered digital signal.

* * * * *